US005551833A

United States Patent [19]
Marsh

[11] Patent Number: 5,551,833
[45] Date of Patent: Sep. 3, 1996

[54] APPARATUS FOR STACKING BAGS OF A PALLET

[76] Inventor: Julian Marsh, 3171 Watterson Trail, Jeffersontown, Ky. 40299

[21] Appl. No.: 356,500

[22] Filed: Dec. 15, 1994

[51] Int. Cl.[6] .......................... B65G 57/06; B65H 29/34
[52] U.S. Cl. ...................... 414/793.4; 414/793.8; 414/794.2; 414/794.3
[58] Field of Search .................... 414/793.4, 793.8, 414/794, 794.2, 794.3, 592, 594, 609, 610, 674, 672

[56] References Cited

U.S. PATENT DOCUMENTS

| | | | |
|---|---|---|---|
| 2,977,002 | 3/1961 | Asp | 414/793.8 |
| 3,164,080 | 1/1965 | Miller, Jr. | 100/35 |
| 3,312,357 | 4/1967 | Stephens et al. | 414/794 |
| 3,533,517 | 10/1970 | Heide | 414/794 |
| 3,624,782 | 11/1971 | McPeek | 214/6 P |
| 3,648,857 | 3/1972 | Grasvoll | 414/793.8 |
| 3,688,920 | 9/1972 | Frish | 214/6 H |
| 3,782,562 | 1/1974 | Burt et al. | 414/794 |
| 3,856,158 | 12/1974 | Currie | 414/793.4 |
| 3,904,043 | 9/1975 | Jones | 414/793.4 |
| 4,015,732 | 4/1977 | Beaty, Jr. et al. | 214/152 |
| 4,024,965 | 5/1977 | Marth et al. | 214/6 P |
| 4,260,309 | 4/1981 | Lynn | 414/46 |
| 4,271,755 | 6/1981 | Kintgen et al. | 100/52 |
| 4,426,184 | 1/1984 | Boyland | 414/82 |
| 4,439,084 | 3/1984 | Werkheiser | 414/62 |
| 4,536,119 | 8/1985 | Miaskoff | 414/100 |
| 4,708,564 | 11/1987 | Mylrea et al. | 414/36 |
| 4,898,511 | 2/1990 | Rossig et al. | 414/793.8 |
| 5,051,058 | 9/1991 | Roth | 414/789.1 |

*Primary Examiner*—Karen B. Merritt
*Assistant Examiner*—Douglas Hess

[57] ABSTRACT

An apparatus and method for stacking bags of granulated material on a pallet which is fixed in position during the stacking operation is disclosed. A bag supporting plate is mounted on an upper end of an apparatus frame for reciprocal horizontal movement between an extended bag receiving position covering a first area and a retracted position wherein the first area is uncovered. A fence mounted on the frame over the path of movement of the plate confines a bag deposited on the plate to the first area as the plate slides from under the bag to its retracted position. A bag carriage assembly is mounted in the frame under the first area for reciprocal vertical movement between a maximum raised position for receiving the bag from the plate and a variable lower position for discharging the bag from the assembly to the pallet. A first air cylinder moves the plate and a cable operated air cylinder moves the assembly. The assembly supports the bag on a pair of door panels which have a closed position secured by a pair of double acting air cylinders. The securing cylinders operate to permit the door panels to gravitate to their open position to discharge the bag to the pallet when the assembly reaches its lower position. Sensors are provided which sense when the assembly is in its raised and lowered position, when a bag has been deposited on the plate, and when the plate has reached its retracted position.

34 Claims, 4 Drawing Sheets

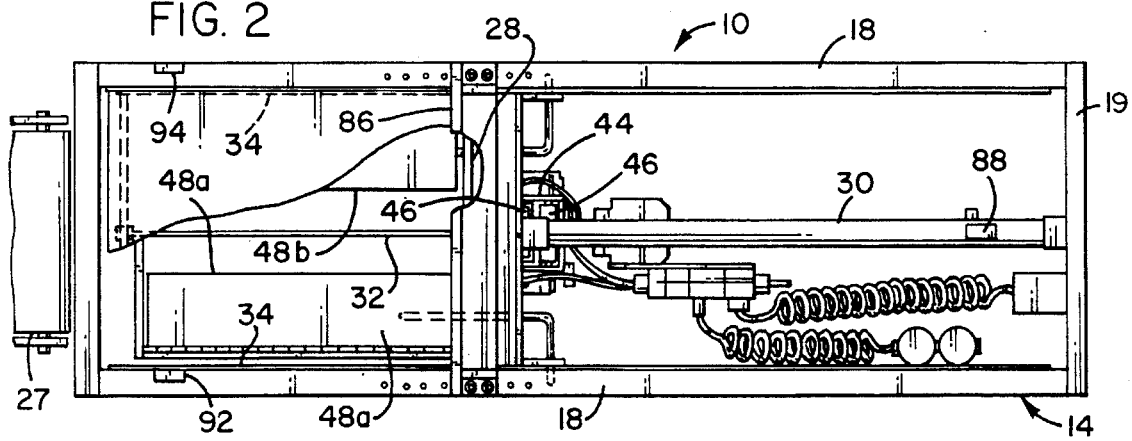
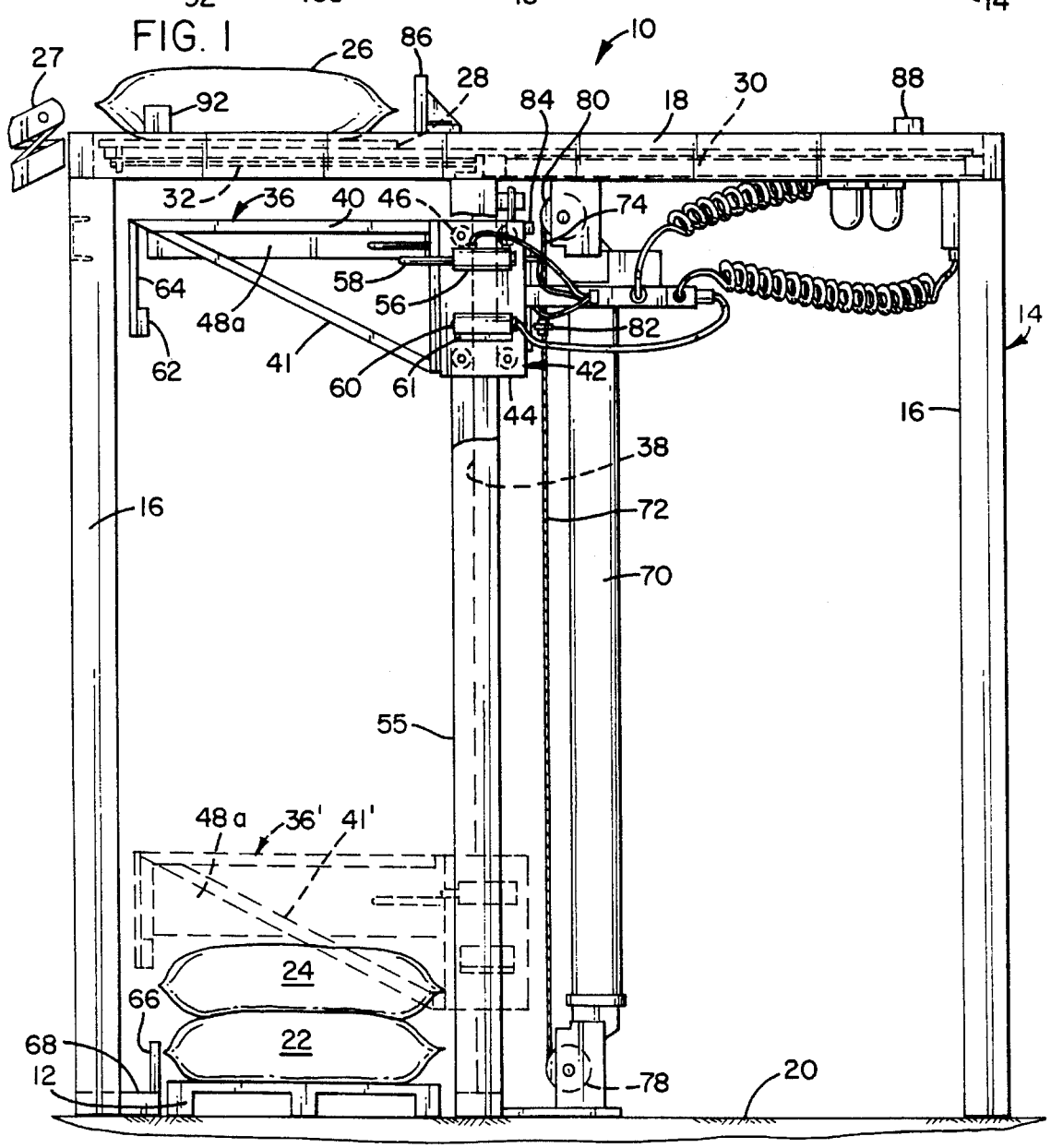

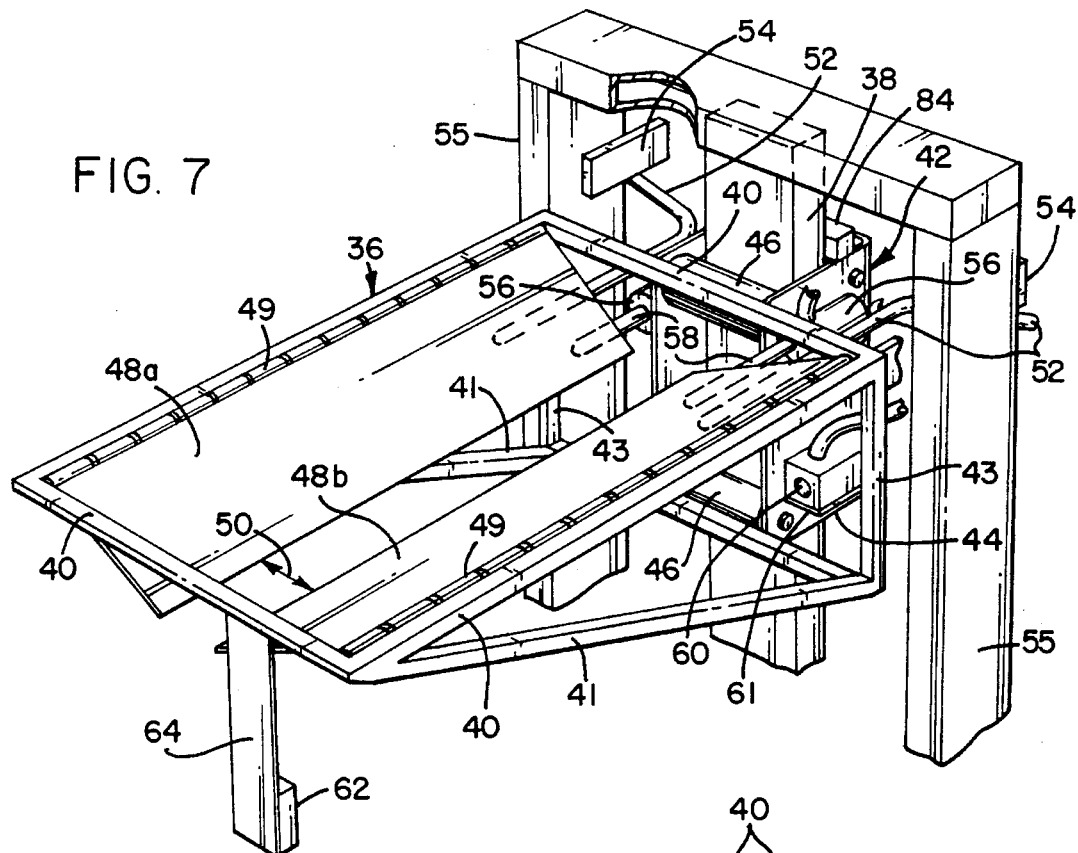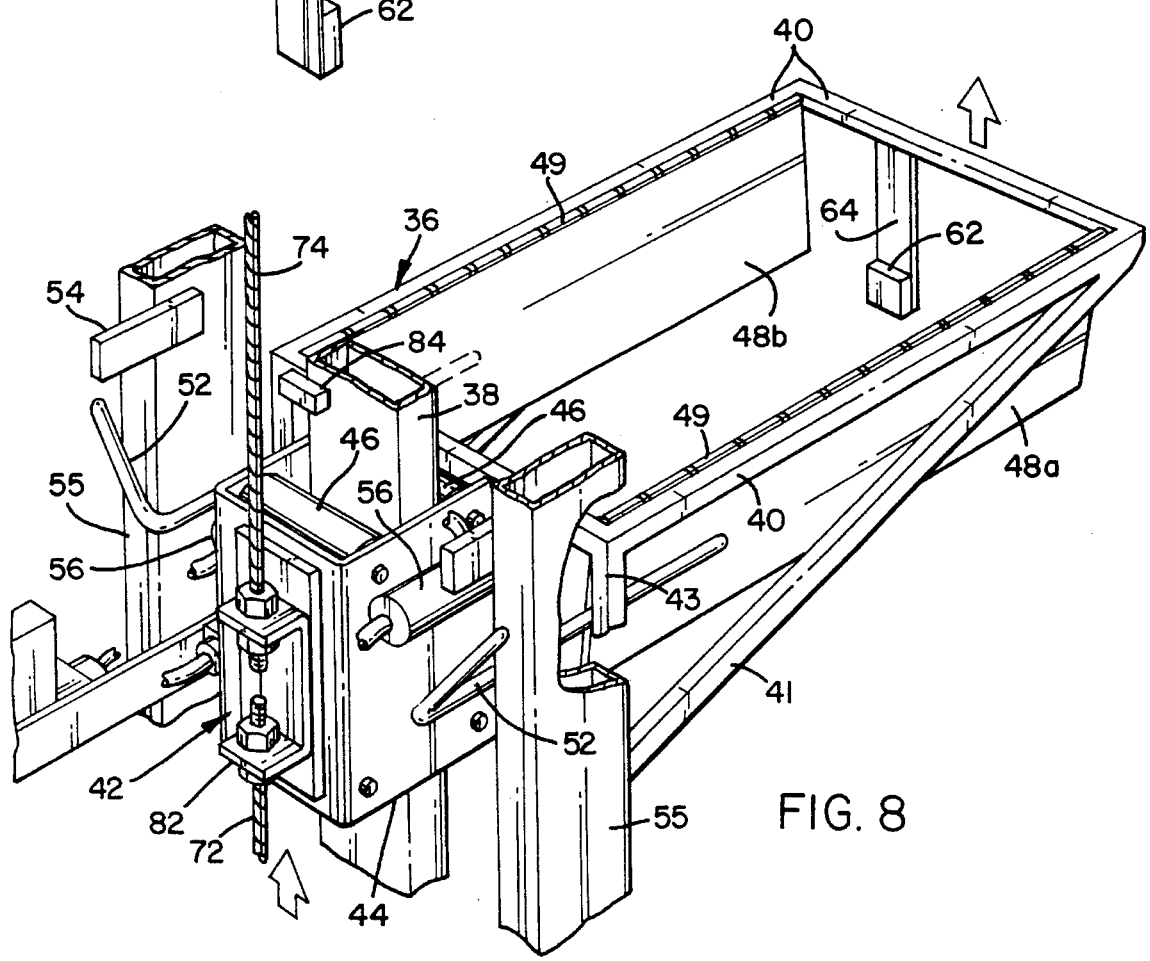

APPARATUS FOR STACKING BAGS OF A PALLET

BACKGROUND OF THE INVENTION

This invention relates generally to an apparatus for use in material handling operations. More specifically, this invention relates to an apparatus for stacking bags of granulated or powdered material in a single column on a pallet or other bag supporting means.

Broadly speaking, bag stacking or palletizing machines have long been known and used as labor saving devices in the prior art. Most of these prior art machines are adapted to stack bags of material on a pallet, wherein an empty pallet is disposed on an elevator platform and raised to a maximum level to receive a first bag or layer of bags from a bag dispenser. Thereafter, the elevator platform and pallet are lowered incrementally to receive additional layers of one or more bags from the dispenser. In this manner, bags are stacked on the pallet to a desired level by the time the elevator platform reaches its lowest level of movement. Upon reaching its lowest level of movement, the filled pallet may be removed from the machine by a fork lift or transferred by means of a conveyor to a remote pick-up station. Examples of various machines which function in this manner are disclosed in the following patents: U.S. Pat. No. 4,708,564 issued to W. J. Mylrea, et al. on Nov. 24, 1987; U.S. Pat. No. 4,271,755 issued to D. I. Kintgen, et al. on Jun. 9, 1981; U.S. Pat. No. 4,260,309 issued to W. F. Lynn on Apr. 7, 1981; U.S. Pat. No. 4,426,184 issued to E. E. Boyland on Jan. 17, 1984; U.S. Pat. No. 4,024,965 issued to G. A. Marth, et al. on May 24, 1977; U.S. Pat. No. 3,624,782 issued to O. A. McPeek, et al. on Nov. 30, 1971; U.S. Pat. No. 3,688,920 issued to W. G. Frish on Sep. 5, 1972; and U.S. Pat. No. 3,164,080 issued to F. H. Miller, Jr. on Jan. 5, 1965. A problem encountered with these machines is the need for strength in the elevator mechanism and in the means employed for moving the elevator mechanism, particularly when the pallet disposed on the elevator mechanism is nearly filled with bags. Other palletizing machines which stack sheets of paper and bundles of newspapers are disclosed U.S. Pat. No. 5,051,058 issued to O. Roth on Sep. 24, 1991; U.S. Pat. No. 4,536,119 issued to L. Miaskoff on Aug. 20, 1985; and U.S. Pat. No. 4,439,084 issued to J. S. Werkeish on Mar. 27, 1984.

An exception to the machines of the previously mentioned patents is the machine disclosed in U.S. Pat. No. 4,015,732 issued to T. Beaty, Jr., et al. on Apr. 5, 1977. This machine includes a transport frame supported by a hoist frame. A vertically movable stacking frame having an encasement bottom is suspended from one end of the transport frame over a platform or conveyor upon which an empty pallet to be loaded with bags is placed. The transport frame also carries a transport conveyor for transporting bags to the stacking frame for arrangement upon the escapement bottom. With the bags so arranged on the escapement bottom, a hoist in the hoist frame lowers the transport frame so as to lower the stacking frame to a level appropriate for disposition of the bags onto the pallet or onto the highest layer of bags that have previously been deposited on the pallet, as the case may be. A pair of vertical members located on opposite ends of the stacking frame are pivotally connected on their lower ends to horizontally extended escapement members to which escapement panels, upon which the bags are disposed, are attached. The vertical members are urged toward one another by hydraulic means to force the escapement members horizontally past one another in opposite directions to draw the escapement panels apart to discharge the bags to the pallet. The vertical members are then urged apart to draw the escapement members in the opposite direction to close the panels.

The subject assembly is both complex and massive. The hoist must be sufficiently powerful to lift and lower the entire transport frame and bag conveyor in order to lift and lower the stacking head. Moreover, the stacking head is itself a complex assembly having numerous pivotally connected members necessary for working together for horizontally move the escapement panels together for closure and apart for discharging the bags.

By means of the present invention, these and other problems encountered in the use of prior art bag stacking machines and methods are substantially overcome.

SUMMARY OF THE INVENTION

It is an object of my invention to provide a new and improved apparatus for stacking bags on a pallet or other bag supporting structure.

Briefly, in accordance with my invention, there is provided an apparatus for stacking bags of granulated material on a pallet. The apparatus includes an upstanding apparatus frame having a section on a lower end portion thereof in which a pallet can be removably positioned, which section is below and in registry with a first area, for stacking a column of the bags thereon. A plate is included for supporting a bag of granulated material thereon which is mounted for reciprocal horizontal movement on an upper end portion of the apparatus frame between an extended bag receiving position covering the first area, and a retracted position located beyond the first area. Further, means is included for confining the bag within the first area as the plate moves from the extended position toward the retracted position with the bag thereon such that the plate slides from under the bag to discharge the bag downwardly. Bag carriage means is also included which is mounted in the apparatus frame in registry with the first area for receiving the bag from the plate, for transporting the bag downwardly from a maximum raised position vertically spaced below the plate to a variable minimum lower position spaced above the pallet and above the highest one of the bags which has previously been disposed on the pallet, if any. A means is included for moving the plate from the extended position to the retracted position upon deposition of the bag onto the plate and for moving the plate from the retracted position to the extended position. A means is included for moving the carriage means from the raised position to the lower position in response to a movement of the plate while the plate travels from the extended position to the retracted position and for moving the carriage means from the lower position back to the raised position. Finally, means is included for discharging the bag from the carriage means downwardly toward the pallet when the carriage means has moved to the lower position.

These and other objects, features and advantages of my invention will become apparent to those skilled in the art from the following detailed description and attached drawings upon which, by way of example, only a preferred embodiment of my invention is illustrated.

BRIEF DESCRIPTION OF THE DRAWINGS

FIG. 1 shows a side elevation view of a bag palletizing apparatus, thus illustrating a preferred embodiment of my invention.

FIG. 2 shows a plan view of the apparatus of FIG. 1.

FIG. 7 shows a perspective view of a portion of the apparatus of FIGS. 1–4 featuring a vertically movable bag carriage assembly as viewed from a front corner of the assembly.

FIG. 8 shows a perspective view of a portion of the apparatus of FIGS. 1–4, being essentially the same portion as shown in FIG. 5 except, in this instance, being viewed from a rear corner of the assembly.

DESCRIPTION OF THE PREFERRED EMBODIMENT

Figure 3:
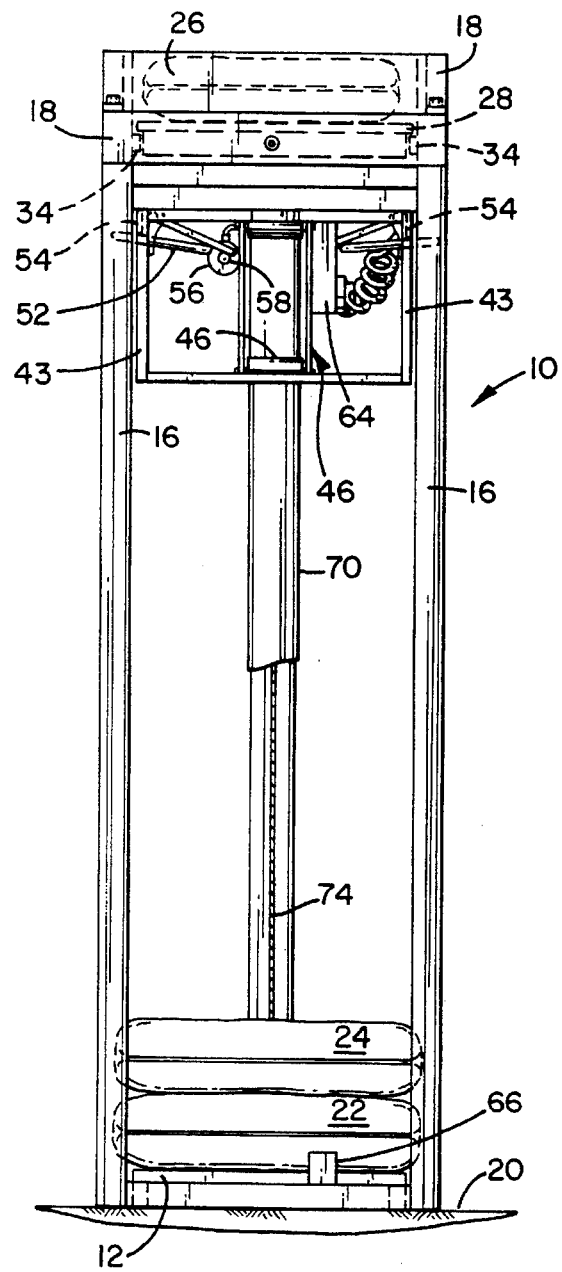
FIG. 3 shows a front elevation view of the apparatus of FIGS. 1–2.
Figure 4:
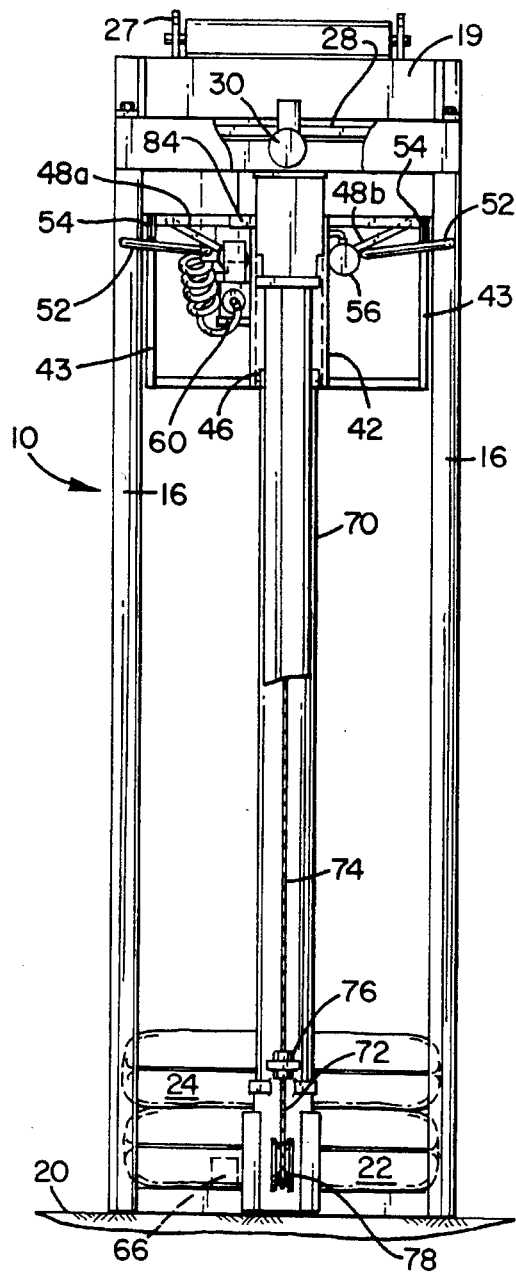
FIG. 4 shows a rear elevation view of the apparatus of FIGS. 1–3.
Figure 5:
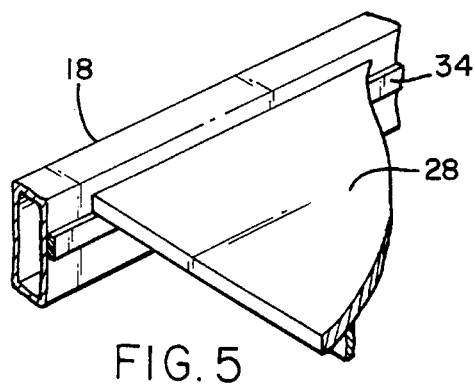
FIG. 5 shows a perspective view of a portion of the apparatus of FIGS. 1–4.
Figure 6:
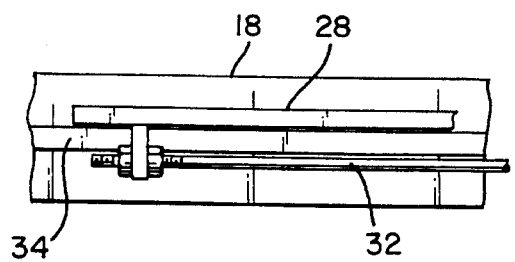
FIG. 6 shows a side elevation view of a fragment of the apparatus of FIGS. 1–4.

Referring now to the drawing figures and, in particular to FIGS. 1–8, there is shown, in a preferred embodiment of my invention, an apparatus generally designated 10, for stacking a column of bags containing granulated or powdered material such as feed grain, flour, cat litter, dog biscuits or cement mix, to name but a few examples, on a conventional pallet 12. The apparatus 10 includes an upstanding frame 14 having elongated vertical support beams or posts 16 at the four corners thereof and horizontally extending side frame members 18 and end frame members 19 interconnecting the upper ends of the posts 16. Preferably the frame 14, including the post 16 and members 18, 19, are constructed of steel. The frame 14 is mounted on a floor 20 and contains a section within a lower end portion thereof in which the pallet 12 can be removably positioned on the floor 20 either manually, by means of a conventional fork lift, not shown, or in any other suitable manner so that bags of granulated material such as shown in FIG. 1 at 22, 24 and 26 as well as others not shown which are delivered to an upper end of the apparatus 10 by a conventional bag conveyor 27 can be stacked in a vertical column on the pallet 12.

The apparatus 10 also includes a relatively flat rectangularly shaped steel plate 28 for supporting a bag of granulated material thereon, such as the bag 26. The plate 28 is horizontally movably mounted on an upper end portion of the frame 14 for linear movement between an extended bag receiving position located on a front end portion of the frame 14 so as to cover a first area which is vertically aligned over and is in registry with the section in which the pallet 12 is positioned, and a retracted position to the right of the first area as viewed, wherein the plate 28 has moved beyond the first area such that the first area is uncovered. In the present example, a double acting air cylinder 30, includes a piston rod 32 which extends under the plate 28, to a left end portion thereof as viewed in FIGS. 1–2, where the piston rod 32 is attached to the plate 28. The cylinder 30 thus provides a means for reciprocally moving the plate 28 between its extended and retracted positions. The plate 28 is adapted to slide back and forth along a pair of elongated plate supporting rails 34 which are welded or otherwise affixed to opposing sides of side frame members 18 and which project horizontally outwardly therefrom in supporting relationship under opposite side edge portions of the plate 28.

Directly below the plate 28 when in its extended position is a bag carriage means or carriage assembly, generally designated 36, which is vertically movably mounted within the frame 14 to a vertically extending beam member or track member 38 having a rectangular horizontal cross section. Preferably, the track member 38 is constructed of steel and forms a part of the apparatus frame 14. The carriage assembly 36 is adapted to carry a single bag, such as the bag 26, after it is discharged from the plate 28 as later explained, from a maximum raised position as shown in full in FIG. 1 to a variable minimum lower position such as shown in phantom in the same figure at 36'. When the carriage assembly 36 reaches the lower position 36', the bag 26 will be discharged therefrom downwardly toward the pallet 12 on top of the bags 22 and 24. The maximum raised position of the carriage assembly 36 should be vertically spaced below the underside of the plate 28 by an amount which is at least equal to the front-to-back thickness of the bag 26 and preferably slightly more so, such that when the bag 26 drops upon the carriage assembly 36, the plate 28 will have clearance to slide back and forth thereover without catching or binding on or against the bag 26 while the carriage assembly 36 remains in its maximum raised position. The carriage assembly 36 includes a rectangular carriage frame 40 which lies in a horizontal plane and which is attached on a rear end thereof to a roller assembly 42 in a cantilevered manner. A pair of diagonally extending struts 41 running between opposite sides of a front end of the frame 40 and the base of a pair of vertically extending supports 43 depending from opposite sides of a rear end of the frame 40 adds rigidity to the carriage assembly 36. The assembly 42 is rollably mounted on the track member 38 and includes a housing 44 containing four cylindrically shaped rollers 46, two of which rollers are located on one side of the track member 38 and the other two of which are located opposite the first two rollers on an opposite side of the track member 38 (See particularly FIG. 1).

The carriage assembly 36 supports a closure means which, in the present example, comprises a trap door having two panels 48a and 48b connected to opposite sides of the frame 40 by hinges 49. The panels 48a and 48b are adapted to tilt upwardly toward one another to a closed position wherein the panels are only partially closed so as to leave a small gap as shown by an arrowed line 50 in FIG. 7, which gap is not so wide as to allow the bag 26 to slip therethrough. In this partially closed configuration, which will be referred to hereafter as the closed position or condition, the panels 48a and 48b are slightly tilted downwardly preferably by an angle of about eight to ten degrees from horizontal so that when the bag 26 is discharged from the plate 28, it will fall onto opposing edge portions of the panels 48a and 48b and over the gap 50. In the event the bag 26 is discharged from the plate 28 downwardly more toward one side of the panels 48a and 48b than the other, gravity and vibration will tend to cause the bag 26 to slide downwardly toward a more centrally aligned position over the gap 50, convenient for ultimate discharge downwardly from the carriage assembly 36 toward the pallet 12. Upon opening to their open position as shown in FIG. 8, the panels 48a and 48b tilt vertically downwardly away from one another so that a bag, which was supported thereon when in their closed position, will be discharged downwardly toward the pallet 12.

One of a pair of rigid L-shaped rods 52 is welded or otherwise fixedly attached to an underside of each of the panels 48a and 48b. The rods 52 project rearwardly from under the panels 48a and 48b and make a right angle bend so as to catch against a pair of panel closing bars 54 attached to and projecting rearwardly from the inside surfaces of two vertically extending carriage track support posts 55 as the carriage assembly 36 moves upwardly to a level near its maximum raised position. When the outwardly extending free end portions of the rods 52 first catch under their corresponding panel closing bars 54, further upward movement of the carriage assembly 36 causes the free end portions of the rods 52 to tilt further outwardly and downwardly so as to cause the panels 48a and 48b to tilt upwardly toward one another and toward their closed position as shown in FIG. 7. Once the carriage assembly 36 reaches its maximum raised position, the panels 48a and 48b reach their closed positions. Once the panels 48a and 48b reach their closed position as previously explained, a means for securing them in their closed position, sufficient to support the weight of the bag 26 thereon, is employed which, in the present example of my invention, includes two double acting air cylinders 56 which contain extendable piston rods 58. The cylinders 56 are affixed to opposite vertical sides of the roller housing 44 such that the piston rods 58 can be extended forwardly relative to the carriage frame 40 so as to slide immediately under rear ends of panels 48a and 48b when in their closed positions so as to secure the panels in such positions as shown in FIG. 7. To open the panels 48a and 48b, the cylinders 56 are actuated so as to withdraw the piston rods 58 to their retracted positions beyond the rear edges of the panels to allow the panels to fall open under their own weight to thus discharge the bag 26 downwardly toward the pallet 12.

Means for sensing when the carriage assembly 36 has descended to its minimum lower position at 36' is provided which includes an electric eye 60 and a reflector 62. The electric eye 60 is mounted on a platform 61 welded or otherwise suitably affixed to one side of the roller housing 44 below one of the panel securing cylinders 56 as best seen in FIG. 1. The reflector 62 is mounted on a lower end portion of a rigid vertically extending bar 64, the other end of which bar is welded or otherwise secured to a front end of the frame member 40. The electric eye 60 and the corresponding reflector 62 are thus aligned with one another below the level of the frame 40 such that a light beam emanating from the electric eye 60 will be reflected by the reflector 62 back to the electric eye 60 until and unless an opaque mass is placed between them so as to interrupt the light beam. This sensing means travels with the carriage assembly 36 and is adapted to initiate two responses upon interruption of the light beam. First, interruption of the light beam will cause further downward movement of the carriage assembly 36 to immediately cease and will cause its upward movement to commence and, second, will cause the cylinders 56 to retract the piston rods 58 from under the panels 48a and 48b to allow the panels to open to discharge a bag therefrom. The level of the electric eye 60 and reflector 62 below the panels 48a and 48b when in their closed positions should be set so that the panels 48a and 48b will open fully downwardly without striking the pallet 12 or the highest bag which has previously been deposited on the pallet, as the case may be.

An opaque light beam interrupting shield 66, which may be constructed of metal of relatively flat rectangular shape, is attached to a rear edge portion of a footer 68 which rests on the floor 20 and which extends transversely across a lower front end of the frame 14 between the two front support beams 16 and which projects rearwardly of those beams as best seen in FIG. 1. The shield 66 extends upwardly a few inches above an upper surface of the pallet 12 and is positioned just rearwardly of the vertical line of movement of the reflector 62 so as to be clear of the reflector's movement and yet be aligned so as to interrupt the light beam between the electric eye 60 and the reflector 62 when those two devices descend to that level. Of course, the electric eye 60 and reflector 62 will only descend to the level of the shield 66 when there are no bags on the pallet 12 or when the pallet 12 is not present as shown and when there are no bags or other light beam interrupting masses of material on the floor 20 in that position. But, in that event, the shield 66 will interrupt the light beam so as to assure that the carriage assembly 36 will not descend to a level wherein the base of the roller housing 44 will slam against the floor 20. There must also be clearance to the rear of the shield 66 for a bag of material to be discharged from the carriage assembly 36 to the pallet 12 or floor 20 without falling on or against the shield 66.

A conventional cable operated double acting air cylinder 70 is employed as a means for vertically moving the carriage assembly 36 along the track member 38. A pair of wire cables 72 and 74 are attached to opposite faces of a piston 76 within the cylinder 70 and extend out of opposite ends of the cylinder 70 around pulleys 78 and 80, respectively, and attach to a bracket 82 affixed to the back of the roller housing 44. When compressed air is applied to an upper end of the cylinder 70, the piston 76 is forced downwardly such that cable 74 lifts the roller assembly 42 and attached carriage assembly 36 upwardly. Conversely, when compressed air is applied to a lower end of the cylinder 70, the piston 76 is forced upwardly, whereby the cable 72 pulls the assemblies 36 and 42 downwardly. The maximum raised position of the carriage assembly 36 is determined by the level of placement of a conventional limit switch or microswitch 84 on an upper end portion of the track member 38 (See FIGS. 1, 4 and 7–8). The limit switch 84 is attached to a rear face of the track member 38 and projects laterally beyond one side thereof so as to be actuated by contact with an upper side edge of the roller housing 44 as the carriage assembly 36 and housing 44 ascend to the selected maximum raised position. The level of placement of the panel closing bars 54 on the posts 55 and the level of placement of the limit switch 84 on the track member 38 should be coordinated such that the panels 48a and 48b will reach their most closed positions for proper extension of the securing cylinder piston rods 58 thereunder upon actuation of the limit switch 84 by contact with the roller housing 44 and consequent termination of further upward movement of the assemblies 36 and 42.

A bag confining rail or fence 86 extends over and across the path of movement of the plate 28 and is attached on opposite ends thereof to opposing side frame members 18. The fence 86 crosses the frame 14 on a central portion thereof and defines and end of the first area which is nearest to the cylinder 30. The other end of the first area is defined by the front edge of the plate 28 when in its fully extended position near a front edge of the frame 14. While the fence 86 is spaced above the plate 28 so as not to obstruct its movement, its height is such as to interfere with and prevent movement of the bag 26 on the plate 28 beyond and to the right of the first area as viewed in FIGS. 1–2, as the plate 28 moves beyond the fence 86 and first area to its fully retracted position. Thus, as the plate 28 moves from its fully extended position toward its fully retracted position, it slides out from under the bag 26 just prior to reaching its fully retracted position. As a result, the bag 26 falls off the left hand end of the plate 28 as viewed in FIGS. 1–2 onto the panels 48a and 48b of the carriage assembly 36 just prior to the plate 28 reaching its fully retracted position.

Once the plate 28 reaches its fully retracted position beyond the first area in which the bag 26 has been confined by the fence 86, a conventional proximity limit switch 88 responsive to the retracted position of a piston within the cylinder 30 is activated to, in turn, activate the cylinder 70 to lower the carriage assembly 36 with the bag 26 then being deposited thereon. After a short time delay following commencement of downward movement of the carriage assembly 36, the plate 28 returns to its extended position preparatory to receiving another bag for ultimate deposition on the pallet 12.

When in its fully extended position, the plate 28 is ready to receive a bag, such as the bag 26, on its upper surface as delivered to it by the conveyor 27. The plate 28 is adapted to remain in the extended bag receiving position until the bag 26 is deposited thereon and until the carriage assembly 36 has returned to its maximum raised position as indicated by actuation of the limit switch 84 by the roller housing 44. To sense when the bag 26 has been deposited on the plate 28 while in its extended position, an electric eye 92 is mounted on one side of the frame 14 on one of the side frame members 18 and a reflector 94 is mounted across from it on the other side frame member 18. The electric eye 92 and reflector 94 are aligned with one another and placed over the plate 28 near a forward end thereof when the plate 28 is in its extended position. As thus arranged, the bag 26, which is deposited on the plate 28 from the conveyor 27 will interrupt the light beam between the electric eye 92 and its reflector 94. Assuming that the limit switch 84 is also activated by the roller housing 44 when this light beam is interrupted, the plate 28 with the bag 26 supported thereon and confined to the first area by the fence 86 will commence movement toward its retracted position.

Figure 9:
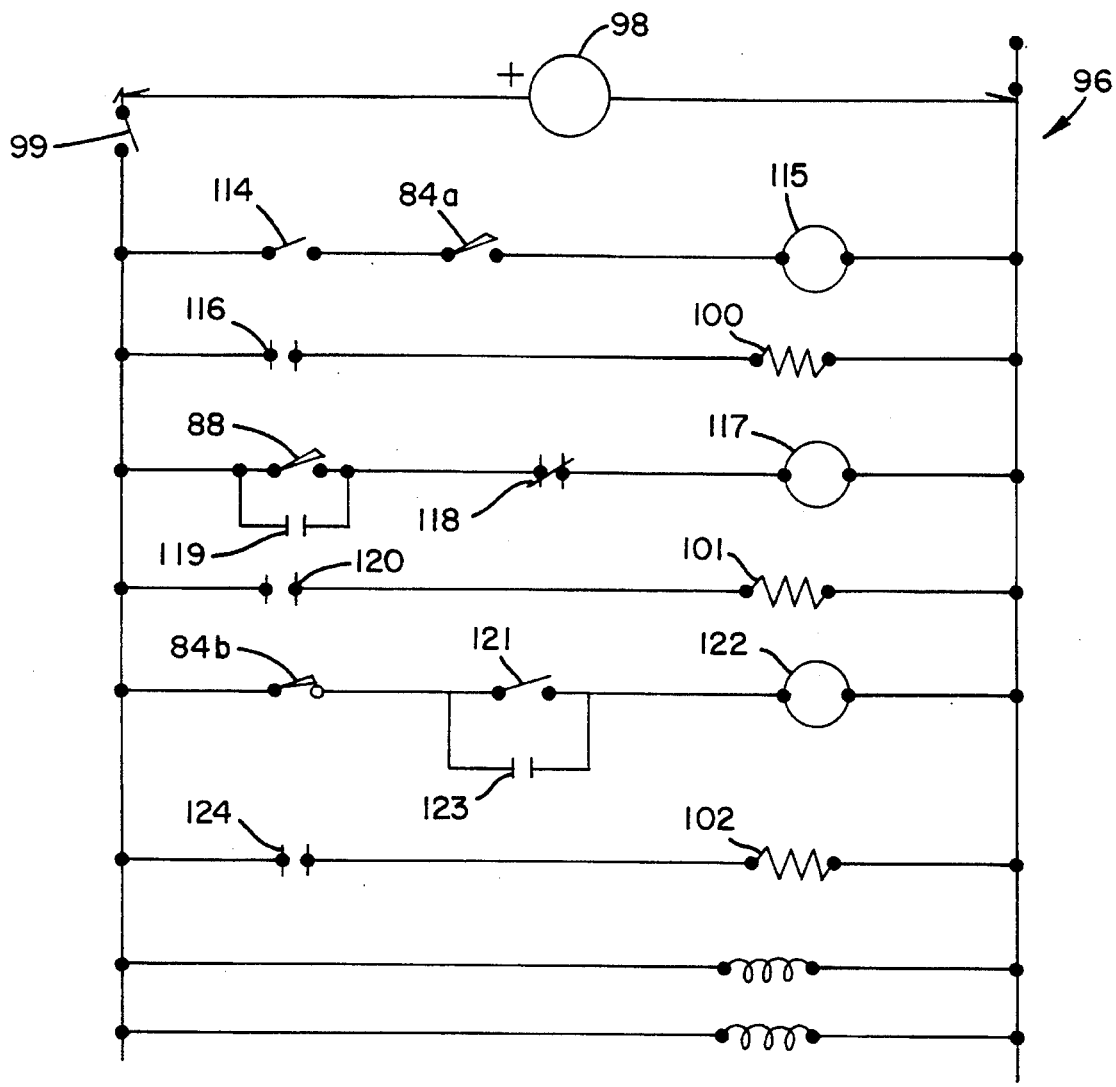
FIG. 9 shows a schematic diagram of an electrical circuit for the apparatus of FIGS. 1–4.
Figure 10:
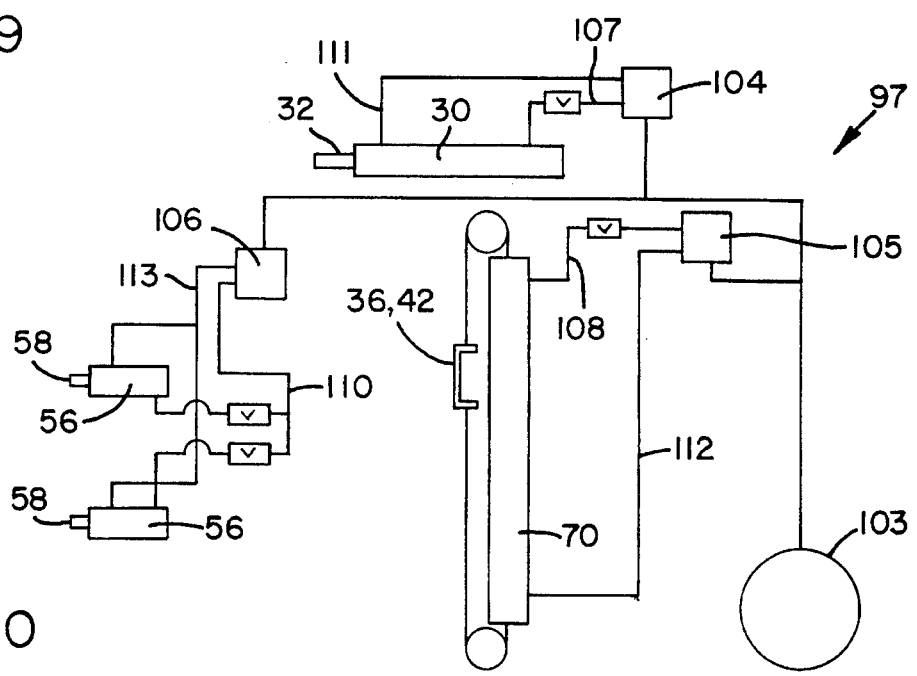
FIG. 10 shows a schematic diagram of a compressed air system for operating the apparatus of FIGS. 1–4.

Referring also to FIGS. 9–10, an electrical control circuit 96 and a compressed air flow switching system 97 controlled by the circuit 96 for operating the cylinders 30, 56 and 70 will now be explained. The circuit 96 is connected to a suitable electric power source such as a commercially available 120 v.a.c., 60 Hz source 98 through a main power switch 99. The circuit 96 includes three solenoids 100, 101 and 102, each of which control the flow of compressed air from a suitable compressed air source 103 through a different one of three two-position air switches 104, 105 and 106, respectively. When the solenoids 100, 101 and 102 are un-energized, the air switches 104, 105 and 106 are in their normal positions, wherein compressed air flows from the source 103 into an air line 107 to the air cylinder 30, into an air line 108 to the carriage cylinder 70, and into an air line 110 to the panel securing cylinders 56. Conversely, when the solenoids 100, 101 and 102 are energized, the air switches 104, 105 and 106 assume their alternate positions to direct compressed air from the source 103 to an air line 111 of cylinder 30 to an air line 112 of the cylinder 70, and to an air line 113 of the cylinders 56. The three elements designated V in FIG. 10 are conventional air pressure regulators which are employed in the air outlet lines 107, 108 and 110 from the air switches 104, 105 and 106, respectively, and suitable regulators for this purpose are identified in a table of components as hereinafter set forth.

Assume initially that (1) the plate 28 is in its extended bag receiving position on the frame 14 such that the piston rod 32 of the cylinder 30 is extended, (2) the carriage and roller assemblies 36 and 42 are at their maximum raised positions wherein the limit switch 84 is actuated and the panels 48*a* and 48*b* are in their closed positions with the piston 76 of the cylinder 70 at its lowest position, (3) the piston rods 58 of the cylinders 56 are extended to secure the panels 48*a* and 48*b* in their closed positions for receiving and supporting the bag 26 when the latter is discharged from the plate 28. Assume further that the bag 26 has not yet been deposited on the plate 28 and that the main power switch 99 of control circuit 96 is closed. Under these initial conditions, solenoid 100 is un-energized such that the air switch 104 is delivering compressed air to the line 107, solenoid 101 is un-energized such that the air switch 105 is delivering compressed air the air line 108, and solenoid 102 is un-energized such that the air switch 106 is delivering compressed air to the air line 110.

A spring biased s.p.s.t. electric eye switch 114 controlled by the light beam between the electric eye 92 and the reflector 94 is normally open when the light beam is uninterrupted. The switch 114 is series connected with a first switch section 84*a* of the limit switch 84, which switch section 84*a* is spring biased to a normally open position except when the limit switch 84 is actuated by the roller housing 42, in which case it is closed. The series combination of the switch 114 and switch section 84*a* is in series with a timer coil 115 across the power source 98. Upon delivery of the bag 26 by the conveyor 27 to the plate 28, the light beam between the electric eye 92 and its reflector 94 is interrupted to momentarily close the switch 114. Since, at that time, the carriage and roller assemblies 36 and 42 are in the maximum raised position such that the limit switch 84 is activated, the normally open switch section 84*a* is closed and it companion normally closed switch section 84*b* is open, opposite their positions as shown in FIG. 9. That being the case, the source 98 is placed across the timer-coil 115 which immediately closes a set of normally open contacts 116 to also place the source 98 across the solenoid 100 for a preset period of time. Even though the switch 114 remains closed only momentarily, just long enough to energize the timer coil 115, once the timer coil 115 is energized to close the contacts 116, the timer coil 115 will continue to hold the contacts 116 closed for the preset time period to keep the solenoid 100 energized until the time sequence of the coil 115 has elapsed. Accordingly, with the solenoid 100 energized, the air switch 104 is activated to divert compressed air from the air line 107 to the air line 111 to retract the piston rod 32 of the cylinder 30, to thus move the plate 28 toward its retracted position.

As the plate 28 so moves with the bag 26 thereon being confined within the first area by the fence 86, the plate 28 slides from under the bag 26, whereupon the latter falls upon the closed and secured panels 48*a* and 48*b* of the carriage assembly 36. After the bag 26 has fallen off the forward end of the plate 28 to the carriage assembly 36, the plate 28 and piston rod 32 reach their retracted position, whereupon the normally open limit switch 88 on the cylinder 36 closes to place the power source 98 across the coil of a control relay 117 through a pair of normally closed relay contacts 118. Since the plate 28 will remain at its retracted position only momentarily before beginning its movement back to the extended position, the limit switch 88 will remain closed only momentarily such that, in order for the control relay coil 117 to remain energized, it must immediately close one set of its relay contacts 119 upon becoming energized through the switch 88, so as to shunt the switch 88. The control relay 117 also immediately closes a second set of normally open relay contacts 120 upon being energized, to place the power source 98 across the solenoid 101. The solenoid 101 thereupon switches the air switch 105 to divert compressed air from the air line 108 to the air line 112 to start the carriage and roller assemblies 36 and 42 on their downward movement to transport the bag 26 to a lower level. Thus, the carriage and roller assemblies 36 and 42 commence their downward movement from the maximum raised position immediately upon the plate 28 and piston rod 32 of the cylinder 30 having reached their retracted position to activate the limit switch 88. Accordingly, the limit switch section 84a opens and the limit switch section 84b closes as the assemblies 36 and 42 begin their descent.

Once the now empty plate 28 and piston rod 32 reach their retracted position, the timer coil 115 continues to hold the contacts 116 closed to produce a slight delay before losing sufficient energy to allow the timer contacts 116 to open to de-energize the solenoid 100 and thus reverse the direction of movement of the plate 28 and rod 32. But, in the mean time, the assemblies 36 and 42 have begun their downward movement under the influence of the now energized control rely coil 117 and solenoid 101. Upon reaching the minimum lower level wherein the bag 26 interrupts the light beam between the electric eye 60 and its reflector 62, a normally open s.p.s.t. electric eye operated switch 121 momentarily closes. Since the switch 121 is in series with the now closed microswitch section 84b, the source 98 will be placed across a second control relay coil 122. Upon energizing the coil 122, a first set of normally open relay contacts 123 will be closed to shunt the electric eye switch 121, a second set of normally open relay contacts 124 will be closed to place the source 98 across the solenoid 102 and a third set of normally closed relay contacts 118 will be opened to de-energize the control relay 117. Upon energizing the solenoid 102 the air switch 106 will be activated to divert compressed air from line 110 to the line 113 to retract the piston rods 58 of the cylinders 56 to permit the panels 48a and 48b to swing open to discharge the bag 26 therefrom.

Also, upon energizing the relay coil 122, the normally closed relay contacts 118 open to de-energize the control relay coil 117 to cause the air switch 105 to divert compressed air from the line 113 back to the line 108 to begin lifting the assemblies 36 and 42 back to the maximum raised position.

Once the assemblies, 36, and 48 return to the maximum raised position to engage the limit switch 84, the switch section 84b opens to de-energize the control relay 122 which permits the contacts 124 to open to de-energize the solenoid 102 to extend the panel securing cylinder rods 58 back under the now closed panels 48a and 48b. Also, the contacts 123 return to their open position to de-energize the control relay 122 and thus cause the contacts 118 return to their closed position. The timing coil 115 is adjusted so that upon de-energizing the solenoid 100, cylinder rod 32 will have time to fully extend to return the plate 28 to its extended position at least slightly prior to the time when the carriage and roller assemblies return to their maximum raised position to activate the limit switch 84.

To complete the description of the present example of my invention, the following table describes suitable components for use in the electrical circuit 96 and air control system 97 of FIGS. 9–10.

| Table of Components | |
|---|---|
| COMPONENT | DESCRIPTION |
| Electric Eyes 60 and 92, including Timer 115 for use with Electric Eye 92 | A.T.C. Beam Switch with timer, No. 7263AR404FRX |
| Limit Switch 84 | Granger, Model No. 60-671 |
| Control Relay 117 and 122 | Granger #5X827, 120 v.a.c., 10 Amp. Double Pole, Double Throw, 8 pin base |
| Air Switch 104, including Solenoid 100 | MAC # PMD 111CA-AA |
| Air Switch 105, including Solenoid 101 | " |
| Air Switch 106, including Solenoid 102 | " |
| Adjustable Regulators | ¼ inch Deltrol Flow Control |
| Cylinder 30, including Proximity Limit Switch 88 | 2 inch diameter TRD Double Acting Cylinder with proximity switch, 3 ft. stroke |
| Cylinders 56 | Bimba Double Acting Cylinders, 2 inch stroke |
| Cylinder 70 | Tool-O-Matic Cable Cylinder, Model No. N100-150 |

While those skilled in the art will appreciate that the dimensions of the apparatus frame 14 may vary widely to suit specific needs, I have constructed a suitable frame which is 6 ft. 7⅜ inches high, by 6 ft. 11¼ inches in inside length, by 2 ft. in inside width. A plate suitable for use as the plate 28 for installation in an apparatus frame 14 of such dimensions may be 3 ft. 2⅜ inches in length, by 1 ft. 11⅞ inches in width, by 3/16 inches thick. A carriage frame suitable for use as the frame 40 for use with frame 14 and plate 28 having the previously mentioned dimensions may be 3 ft. 2½ inches in inside length, by 1 ft. 9½ inches in inside width. It will also be appreciated that various modifications may be made to the apparatus 10 of the present example without departing from the scope of my invention. For example, the cylinders 30, 56 and 70 or any one or more of them may be of the hydraulically operated type. Also, the plate 28 may be reciprocally movable between its extended and retracted positions in any suitable manner such as, for example, by being mounted on rollers or by having rollers attached to opposite side edges thereof.

While in the present example, the carriage and roller assemblies 36 and 42 start their descent from their maximum raised position in response to the plate 28 having moved to its fully retracted position, the assemblies 36 and 42 could be allowed to begin their descent at the time the plate 28 first begins to move away from its extended position or at any time thereafter during movement of the plate 28 toward the retracted position. In the latter case, the speed of movement of the plate 28 should be such as to assure that the bag 26 will be discharged upon the panels 48a and 48b before the assemblies 36 and 42 have descended more than about 6 to 8 inches below the underside of the plate 28 or, otherwise, by such a distance below the plate 28 as to result in too great of an impact of the bag 26 upon the panels 48a and 48b. Also, while I prefer to start descent of the assemblies 36 and 42 when the plate 28 reaches its fully retracted position and allow the plate 28 to remain at the extended position for a short time before starting its return to the extended position, the plate 28 could be allowed to return immediately to its extended position upon reaching its retracted position, so long as the assemblies 36 and 42 have descended a sufficient distance before the plate 28 begins its return movement, such that it does not collide with or otherwise damage the bag 26.

Although the present invention has been described with respect to specific details of a certain preferred embodiment thereof, it is not intended that such details limit the scope and coverage of this patent other than as specifically set forth in the following claims.

I claim:

1. An apparatus for stacking a column of bags on a pallet, comprising:
   a) a frame having a slidable plate mounted at a horizontal upper end of said frame for supporting a bag when said slidable plate is in an extended position, a stationary fence positioned near said slidable plate on a side opposite said slidable plate's extended position and a track attached to said frame for directing vertical movement and positioning of a carriage assembly beneath said slidable plate;
   said carriage assembly further comprising downwardly opening panels for supporting the bag being transported downwardly from near said slidable plate toward the column of bags, means for closing said carriage assembly panels and a first sensor for detecting an uppermost column surface thereby opening the carriage assembly panels and reversing the vertical movement of said carriage assembly after the bag has been deposited on the column;
   b) means for vertically moving said carriage assembly; and
   c) means for retracting and extending said slidable plate.

2. The invention of claim 1 further comprising a second sensor for limiting upward vertical movement of said carriage assembly.

3. The invention of claim 1 wherein said means for retracting and extending said slidable plate further comprises a third sensor for initiating downward movement of said carriage assembly.

4. The invention of claim 1 further comprising a fourth sensor for detecting a deposit of the bag on said slidable plate.

5. The invention of claims 1 or 4 wherein said first and fourth sensors are electric eyes.

6. The invention of claims 2 or 3 wherein said second and third sensors are limit switches.

7. The invention of claims 1, 2, 3 or 4 wherein said first, second, third and fourth sensors operate sequentially to control transporting of the bags and for stacking the column from a lowest to a highest level on the pallet.

8. The invention of claim 1 wherein said means for vertically moving said carriage assembly further comprises a first double acting cylinder and cables extending from opposite ends of said first cylinder attached to said carriage assembly.

9. The invention of claim 1 wherein said means for retracting and extending said slidable plate further comprises a second double acting cylinder and an accompanying piston rod.

10. The invention of claim 1 wherein said means for securing the closing of said carriage assembly panels further comprises a third double acting cylinder and an accompanying piston rod.

11. The invention of claim 1 wherein said means for securing the closing of said carriage assembly panels further comprises a rod and an accompanying closing bar.

12. The invention of claim 1 wherein said carriage assembly further comprises a roller assembly.

13. The invention of claim 1 wherein said carriage assembly panels are tilted downwardly from horizontal at about an angle of eight to ten degrees when closed.

14. An apparatus for stacking a column of bags on a pallet, comprising:
   a) a frame having a slidable plate mounted at a horizontal upper end of said frame for supporting a bag when said slidable plate is in an extended position, a stationary fence positioned near said slidable plate on a side opposite said slidable plate's extended position and a track attached to said frame for directing vertical movement and positioning of a carriage assembly beneath said slidable plate;
   said carriage assembly further comprising downwardly opening panels for supporting the bag being transported downwardly from near said slidable plate toward the column of bags, means for closing said carriage assembly panels and a first sensor for detecting an uppermost column surface thereby opening the carriage assembly panels and reversing the vertical movement of said carriage assembly after the bag has been deposited on the column;
   b) a first double acting cylinder and cables extending from opposite ends of said first cylinder attached to said carriage assembly for supplying vertical movement to said carriage assembly;
   c) a second double acting cylinder and an accompanying piston rod for retracting and extending said slidable plate; and
   d) a second sensor for limiting upward vertical movement of said carriage assembly.

15. The invention of claim 14 further comprising a third sensor for initiating downward movement of said carriage assembly.

16. The invention of claim 14 further comprising a fourth sensor for detecting a deposit of the bag on said slidable plate.

17. The invention of claims 14 or 15 wherein said second and third sensors are limit switches.

18. The invention of claims 14, 15 or 16 wherein said first, second, third and fourth sensors operate sequentially to control transporting of the bags and for stacking the column from a lowest to a highest level on the pallet.

19. The invention of claims 14 or 16 wherein said first and fourth sensors are electric eyes.

20. The Invention of claim 14 wherein said means for securing the closing of said carriage assembly panels further comprises a rod and an accompanying closing bar.

21. The invention of claim 14 wherein said means for securing the closing of said carriage assembly panels further comprises a third double acting cylinder and an accompanying piston rod.

22. The invention of claim 14 wherein said carriage assembly panels are tilted downwardly from horizontal at about an angle of eight to ten degrees when closed.

23. An apparatus for stacking a column of bags on a pallet, comprising:
   a) a frame having a slidable plate mounted at a horizontal upper end of said frame for supporting a bag when said slidable plate is in an extended position, a stationary fence positioned near said slidable plate on a side opposite said slidable plate's extended position and a track attached to said frame for directing vertical movement and positioning of a roller carriage assembly beneath said slidable plate;
   said roller carriage assembly further comprising downwardly opening panels for supporting the bag being transported downwardly from near said slidable plate toward the column of bags, a third double acting cylinder and an accompanying piston rod for securing said roller carriage assembly panels and a first sensor for detecting an uppermost column surface thereby opening the roller carriage assembly panels and reversing the vertical movement of said roller carriage assembly after the bag has been deposited on the column;

b) a first double acting cylinder and cables extending from opposite ends of said first cylinder attached to said roller carriage assembly for supplying vertical movement to said roller carriage assembly;

c) a second double acting cylinder and an accompanying piston rod for retracting and extending said slidable plate;

d) a second sensor for limiting upward vertical movement of said roller carriage assembly; and e) a third sensor for initiating downward movement of said carriage assembly.

24. The invention of claim 23 further comprising a fourth sensor for detecting a deposit of the bag on said slidable plate.

25. The invention of claims 23 or 24 wherein said first and fourth sensors are electric eyes.

26. The invention of claims 23 or 24 wherein said first, second, third and fourth sensors operate sequentially to control transporting of the bags and for stacking the column from a lowest to a highest level on the pallet.

27. The invention of claim 23 further comprising a rod and an accompanying closing bar for securing the closing of said roller carriage assembly panels.

28. The invention of claim 23 wherein said second and third sensors are limit switches.

29. The invention of claim 23 wherein said roller carriage assembly panels are tilted downwardly from horizontal at about an angle of eight to ten degrees when closed.

30. An apparatus for stacking a column of bags on a pallet, comprising:

a) a frame having a slidable plate mounted at a horizontal upper end of said frame for supporting a bag when said slidable plate is in an extended position, a stationary fence positioned above said slidable plate on a side opposite said slidable plate's extended position and a track attached to said frame for directing vertical movement and positioning of a roller carriage assembly beneath said slidable plate;

said roller carriage assembly further comprising downwardly opening panels for supporting the bag being transported downwardly from near said slidable plate toward the column of bags, a third double acting cylinder and an accompanying piston rod for securing said roller carriage assembly panels, a rod and an accompanying closing bar for closing said roller carriage assembly panels and a first sensor for detecting an uppermost column surface thereby opening the roller carriage assembly panels and reversing the vertical movement of said roller carriage assembly after the bag has been deposited on the column;

b) a first double acting cylinder and cables extending from opposite ends of said first cylinder attached to said roller carriage assembly for supplying vertical movement to said roller carriage assembly;

c) a second double acting cylinder and an accompanying piston rod for retracting and extending said slidable plate;

d) a second sensor for limiting upward vertical movement of said roller carriage assembly;

e) a third sensor for initiating downward movement of said carriage assembly; and f) a fourth sensor for detecting a deposit of the bag on said slidable plate.

31. The invention of claims 30 wherein said first and fourth sensors are electric eyes.

32. The invention of claim 30 wherein said second and third sensors are limit switches.

33. The invention of claim 30 wherein said roller carriage assembly panels are tilted downwardly from horizontal at about an angle of eight to ten degrees when closed.

34. The invention of claim 30 wherein said first, second, third and fourth sensors operate sequentially to control transporting of the bags and for stacking the column from a lowest to a highest level on the pallet.

* * * * *